US012643208B2

(12) United States Patent
Korshamn

(10) Patent No.: US 12,643,208 B2
(45) Date of Patent: Jun. 2, 2026

(54) TOOL FOR FASTENING AND RELEASING A WALL ANCHOR

(71) Applicant: Tor Korshamn, Stavanger (NO)

(72) Inventor: Tor Korshamn, Stavanger (NO)

( * ) Notice: Subject to any disclaimer, the term of this patent is extended or adjusted under 35 U.S.C. 154(b) by 360 days.

(21) Appl. No.: 18/562,596

(22) PCT Filed: May 24, 2022

(86) PCT No.: PCT/NO2022/050114
§ 371 (c)(1),
(2) Date: Nov. 20, 2023

(87) PCT Pub. No.: WO2022/260527
PCT Pub. Date: Dec. 15, 2022

(65) Prior Publication Data

US 2024/0261949 A1 Aug. 8, 2024

(30) Foreign Application Priority Data

Jun. 9, 2021 (NO) .................................... 20210743

(51) Int. Cl.
*B25B 27/14* (2006.01)

(52) U.S. Cl.
CPC .................................... *B25B 27/14* (2013.01)

(58) Field of Classification Search
CPC ..... B25B 27/14; B25B 27/0007; B25B 31/00; B21J 15/50; B21J 15/386; B21J 15/043; F16B 13/124
See application file for complete search history.

(56) References Cited

U.S. PATENT DOCUMENTS

| | | | |
|---|---|---|---|
| 1,802,666 | A | 4/1931 | Mueller |
| 2,470,327 | A | 5/1949 | Tener |

(Continued)

FOREIGN PATENT DOCUMENTS

| | | |
|---|---|---|
| BE | 1017209 | 5/2008 |
| CN | 1297803 A | 6/2001 |

(Continued)

OTHER PUBLICATIONS

Office Action issued in Chinese Patent Application No. 202280041524.8, dated Nov. 29, 2025.

(Continued)

*Primary Examiner* — Seahee Hong
(74) *Attorney, Agent, or Firm* — ANDRUS INTELLECTUAL PROPERTY LAW, LLP

(57) ABSTRACT

A wall anchor fastening and releasing tool having a tool body forming a slide housing, a handle rigidly projecting from the slide housing, a slide arranged inside the slide housing, and a first lever pivotally connected to the handle and arranged to displace the slide in the slide housing between a first position and a second position. When the first lever is in the first position, a screw gripping end of the slide is adjacent a first housing end, and, when in the second position, the screw gripping end of the slide is retracted in the slide housing and a screw pushing end of the slide is adjacent a second housing end, the screw gripping end of the slide being arranged to grip underneath a head of a wall anchor center screw, and the second housing end being arranged to grip underneath a wall anchor collar.

14 Claims, 7 Drawing Sheets

(56) References Cited

U.S. PATENT DOCUMENTS

| | | | | |
|---|---|---|---|---|
| 2,582,417 | A | 1/1952 | Frederick | |
| 4,617,692 | A | 10/1986 | Bond et al. | |
| 4,625,538 | A * | 12/1986 | Malagnoux | B25B 27/0007 72/391.2 |
| 4,941,252 | A * | 7/1990 | Haisch | B25B 27/023 29/261 |
| 6,474,129 | B1 * | 11/2002 | Anquetin | B25B 27/0007 72/391.8 |
| 9,782,877 | B2 * | 10/2017 | Marquis | B25B 27/02 |
| 2004/0244179 | A1 | 12/2004 | Warfield | |

FOREIGN PATENT DOCUMENTS

| | | | |
|---|---|---|---|
| CN | 207155687 | U | 3/2018 |
| DE | 10065080 | | 7/2002 |
| EP | 0693653 | A1 | 1/1996 |
| EP | 1106306 | | 6/2001 |
| GB | 2289006 | | 11/1995 |
| IT | 8321895 | | 5/1983 |
| JP | 2010043427 | | 2/2010 |
| WO | 9609916 | A2 | 4/1996 |
| WO | 2020077396 | A1 | 4/2020 |

OTHER PUBLICATIONS

International Search Report and the Written Opinion issued in corresponding PCT Application No. PCT/NO2022/050114, dated Aug. 15, 2022.

Norwegian Search Report issued in Corresponding Norwegian Application No. 20210743, dated Jan. 5, 2022.

* cited by examiner

TOOL FOR FASTENING AND RELEASING A WALL ANCHOR

CROSS-REFERENCE TO RELATED APPLICATIONS

This application is the U.S. national stage application of International Application PCT/NO2022/050114, filed May 24, 2022, which international application was published on Dec. 15, 2022, as International Publication WO 2022/260527 in the English language. The International Application claims priority of Norwegian Patent Application No. 20210743, filed Jun. 9, 2021. The international application and Norwegian application are both incorporated herein by reference, in entirety.

FIELD

A wall anchor fastening and releasing tool is disclosed, said tool comprising a tool body forming a slide housing, a handle rigidly projecting from the slide housing, a slide arranged inside the slide housing, and a first lever pivotally connected to the handle and arranged to displace the slide in the slide housing between a first position and a second position.

BACKGROUND

When installing wall anchors, i.e., a plug with a head provided with a collar and a foot with inner screw threads, and there in between a deformable part deforming under the influence of a pressure force on the outer ends of the plug by turning a centre screw, there is a risk of rotating the outside collar and the inside body of the wall anchor relative to a plate of a hollow wall, resulting in tearing the outside and the inside surface portions of the wall plate adjacent to a plug hole. Also, rotating the centre screw with a screwdriver or a drill with the wrong bit or force can ruin the screw.

EP1106306 A1 discloses a setting gripper for an anchor device of the type comprising two co-axial components of which each has a head and of which the heads are spread apart co-axially during setting. The setting gripper comprises two jaws which are engaged between the two heads and are spread apart by pivoting a lever relative to a gripper body round axes which are further and further removed from a zone of cooperation between the lever and a slider defining one of the two jaws, whereas the other jaw is defined by the gripper body.

BE1017209 A3 discloses a tool for the fastening of a wall anchor. The tool is provided with a body in which a bar is movable in an axial direction. On the head of the bar and in an extension of it a bolt projects from the body which can work in conjunction with the screw thread in the foot of the plug. Under activation, the bolt and the plug foot are drawn with a specific force backwards to the body, whereby the head of the plug rests against the body, so that the pressure force is created to deform the plug. A manually operated button at the outer end of the bar rotates the bar and the bolt in relation to the body.

Wall anchors can also be difficult to remove. Abandoned wall anchors are some-times left in the wall after being pushed further into the wall by screwing or hammering, resulting in risk of damage.

U.S. Pat. No. 4,941,252 A discloses a hand-held tool capable of removing a wall anchor, such as a so-called molly bolt, from attachment to a wall. The tool includes a pair of jaw members which move into gripping relationship onto the exposed end flange of an anchor bolt, following which a lead screw on the tool engages the attachment screw of the anchor bolt and forces the attachment screw inwardly of the wall. This action causes the legs of the wall anchor to be straightened and to become sufficiently narrow in transverse dimension so that the wall anchor can be manually pulled out of the wall through the hole provided therefor.

SUMMARY

One of the drawbacks of prior art tools for fastening and releasing wall anchors is the need of using two different types of tools. The invention has for its object to remedy or to reduce at least one of the drawbacks of the prior art, or at least provide a useful alternative to prior art.

The object is achieved through features, which are specified in the description below and in the claims that follow.

A tool for fastening and releasing wall anchors is provided, the tool comprising a body with a fastening end and an opposing releasing end, the body forming a housing accommodating a slide displaceable by a first lever arranged along a handle rigidly projecting from the housing, and a second lever arranged at the housing opposite the grip. The first lever is pivotally connected to the handle adjacent the housing and arranged for displacing the slide inside the housing of the body between a first position wherein a screw gripping end of the slide is adjacent a first end of the housing, and a second position wherein the screw gripping end of the slide is retracted in the housing and a screw pushing end of the slide is adjacent a second end of the housing. The screw gripping end of the slide is arranged to grip underneath a head of a centre screw of the wall anchor during a wall anchor fastening operation, while the opposing screw pushing end of the slide is arranged to push on the head of said centre screw during a wall anchor releasing operation. The screw gripping end of the slide may be formed with a first claw. The screw pushing end of the slide may be flat, possibly countersunk to guide the centre screw head to the centre of said end of the slide.

Said first end of the housing is arranged to bear against a wall anchor collar, allowing the centre screw head engage with the screw gripping end of the slide.

Said second end of the housing is arranged to grip underneath the wall anchor collar, and is preferably formed as a second claw, arranged to cooperate with a gripping end of the second lever, said gripping end being adjacent the second end of the housing and arranged to be inserted underneath the wall anchor collar, preferably formed as a third claw facing the second claw.

To ease the insertion of the second end portion of the housing and the free end portion of the second lever underneath the wall anchor collar, said end portions are preferably formed with slanted forward portions forming relatively sharp forward edges.

The slide and the second lever are preferably connected to means arranged to revert said slide and lever to defined idle positions when inoperative, preferably in the form of springs.

In one embodiment a rack and pawl system is provided between the first lever and the slide arranged for displacing the slide between the first and second positions. The pawl is releasable from engagement with a rack which is integrated in the slide.

By engaging the fastening end of the tool body to the centre screw of a wall anchor, positioning the wall anchor in a bore of a wall plate or the like and pressing the first lever, the slide is pulling the centre screw while the first end of the housing rests against the wall anchor collar, causing the wall anchor expanding on the backside of the wall plate.

By partly unscrewing the centre screw of an installed wall anchor, and thereafter inserting the projecting portion of the centre screw in the housing, engaging the second end of the housing and the gripping end of the second lever underneath the wall anchor collar and pressing the first lever, the slide is pushing the centre screw while the wall anchor is withheld by the grip underneath the collar, causing the expanded portion on the backside of the wall plate to become straightened and to become sufficiently narrow in transverse dimension so that the wall anchor can be pulled out of the bore of the wall.

The invention is defined by the independent patent claim. The dependent claims define advantageous embodiments of the invention.

More specifically, the invention relates to a wall anchor fastening and releasing tool comprising a tool body forming a slide housing, a handle rigidly projecting from the slide housing, a slide arranged inside the slide housing, and a first lever pivotally connected to the handle and arranged to displace the slide in the slide housing between a first position and a second position, wherein, when the first lever is in the first position, a screw gripping end of the slide is adjacent a first housing end, and wherein, when the first lever is in the second position, the screw gripping end of the slide is retracted in the slide housing and a screw pushing end of the slide is adjacent a second housing end, the screw gripping end of the slide being arranged to grip underneath a head of a wall anchor centre screw, and the second housing end being arranged to grip underneath a wall anchor collar.

A second lever may be pivotally connected to the slide housing with a lever gripping end arranged adjacent the second housing end to selectively grip underneath the wall anchor collar. An effect of this is that the wall anchor can be held in a firm grip during the release operation, the lever gripping end and the second housing end forming a jaw.

The second housing end may be provided with an anchor collar grip in the form of a claw facing a centre line of the slide housing. An effect of this is that the insertion of the anchor collar grip underneath the collar is eased.

A second lever may be pivotally connected to the slide housing with a lever gripping end arranged adjacent the second housing end, the lever gripping end being provided with a claw facing a claw provided in the second housing end, said claws forming a jaw arranged to grip underneath the wall anchor collar. An effect of this is that the insertion of the grips underneath the collar is eased, and the wall anchor can be held in a firm grip during the release operation, the lever gripping end and the second housing end forming a jaw.

The claws may be provided with slanted forward portions forming opposing sharp forward edges. An effect of this is that the insertion of the grips underneath a tight-fitting collar is further eased.

The screw gripping end of the slide may be provided with a claw arranged to support underneath the head of the wall anchor centre screw. An effect of this is that the manufacture and maintenance of the tool is simplified.

The slide may be connected to means arranged to revert the slide to a defined idle position when inoperative. An effect of this that a resting tool is ready for engagement with the wall anchor.

The second lever may be connected to means arranged to revert the second lever to a defined idle position when inoperative. An effect of this is that the second lever remains in the designed idle position unless operated.

Said means may be one or more springs arranged at the respective lever. An effect of this is that uncomplicated and cheap lever reverting means are provided.

The screw pushing end of the slide may be countersunk. An effect of this is that the centre screw of the wall anchor is easily brought in correct position prior to release of the wall anchor.

A centre screw projecting length scale may be provided on a projecting end portion of the tool body. An effect of this is that the projecting length of the centre screw can be accurately and correctly set prior to fastening or releasing the wall anchor.

BRIEF DESCRIPTION OF THE DRAWINGS

In the following is described examples of preferred embodiments illustrated in the accompanying drawings, wherein.

DETAILED DESCRIPTION OF THE DRAWINGS

Figure 1:
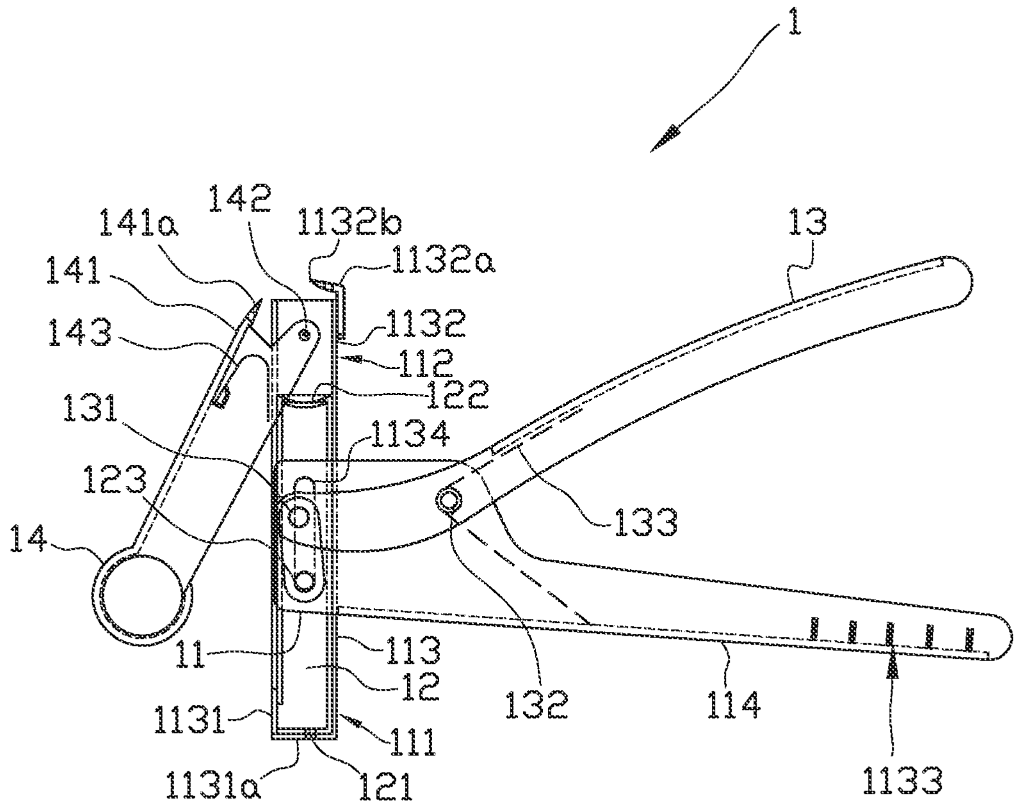
FIG. 1 shows a side view of a wall anchor tool in an idle state.

Any positional indications refer to the position shown in the figures.

In the figures, same or corresponding elements are indicated by same reference numerals. For clarity reasons, some elements may in some of the figures be without reference numerals.

A person skilled in the art will understand that the figures are just principal drawings. The relative proportions of individual elements may also be distorted.

In FIG. 1 a wall anchor fastening and releasing tool with reference numeral 1 is provided with a tool body 11 with a fastening portion 111 and a releasing portion 112, wherein a slide housing 113 is rigidly connected to a handle 114 projecting from the slide housing 113. A first housing end 1131 provides an anchor contact face 1131*a*, and a second housing end 1132 is provided with an anchor collar grip in the form of a claw 1132*a* pointing at a centre axis of the slide housing 113. A claw end portion 1132*b* form sharp claw edges.

A slide 12 is accommodated inside the slide housing 113 and is provided with a screw gripping end 121 in the form of a claw directed transversally to a centre axis of the slide 12. An opposing slide end is forming a screw pushing end 122, preferably with a countersunk end facing. The slide 12 is displaceable in the full length of the slide housing 113 between a first position and a second position, wherein, when in the first position, the screw gripping end 121 is adjacent the first housing end 1131, and, when in the second position, the screw gripping end 121 is retracted in the slide housing 113 and the screw pushing end 122 is adjacent the second housing end 1132.

A first lever 13 is pivotally attached to the handle 114 at a pivot axis 132 and is connected to the slide 12 by a slide link 131 and a connector 123 provided in the slide 12, projecting through a slot 1134 in the slide housing 113, the first lever 13 being arranged to displace the slide 12 towards its second position when the free end of the first lever 13 is pushed towards the handle 114. Means for reverting the slide 12 to the first position is provided, here schematically shown as a spring 133 at the first lever 13.

A second lever 14 is pivotally connected to the slide housing 113 at a pivot axis 142 with a lever gripping end 141 arranged adjacent the second housing end 1132, the lever gripping end 141 being provided with a claw 141*a* facing the claw 1132*a* provided in the second housing end 1132. Said claws 141*a*, 1132*a* form a jaw. Means for reverting the second lever 14 to an idle position when not operated is provided, here schematically shown as a second spring 143. Preferably, the idle position of the second lever 14 is with the lever gripping end 141 withdrawn from the anchor collar grip 1132*a* of the slide housing 113.

The wall anchor tool 1 is provided with a scale 1133 to be used as an indicator of how far out a centre screw 32 is to be set prior to using the tool 1 for fastening and releasing a wall anchor 3. The scale 1133 is here shown at a projecting end portion of the handle, however, various positions can be used.

Figure 2:
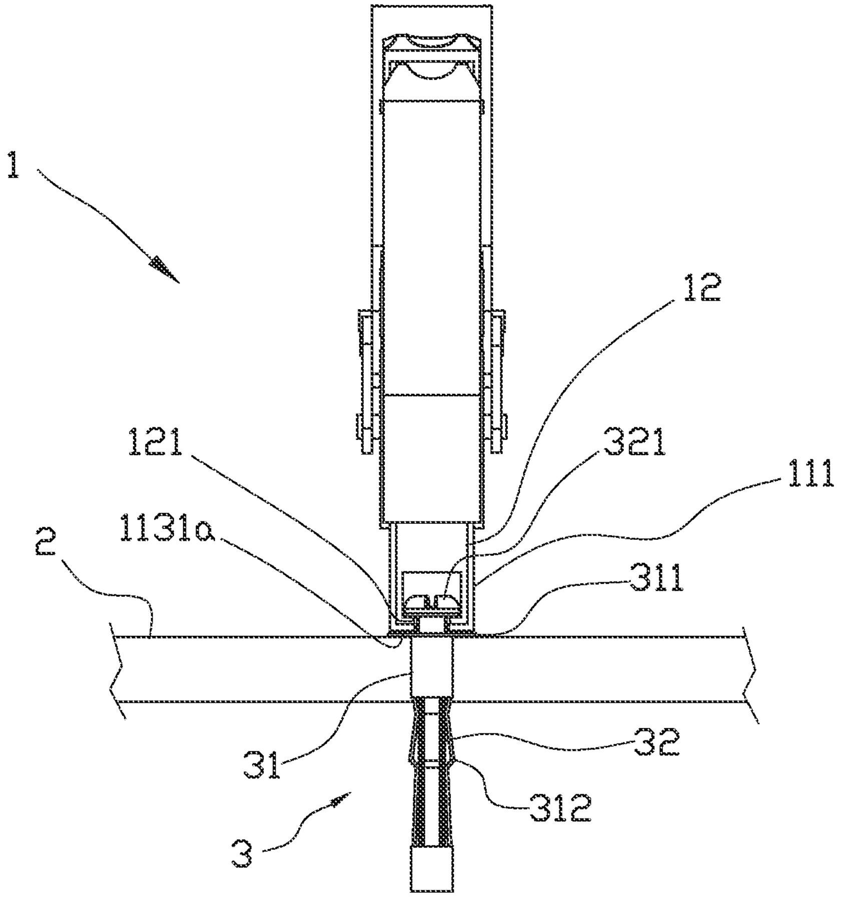
FIG. 2 shows in more details a side view of the fastening end of a tool housing engaging a centre screw of a wall anchor positioned in a bore of a wall plate.
Figure 3:
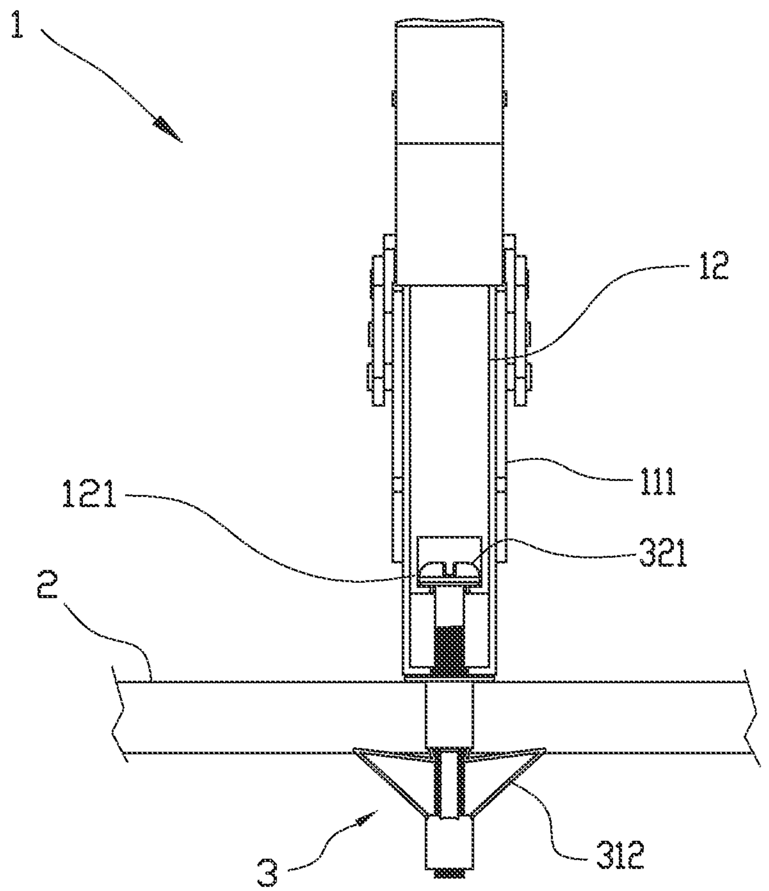
FIG. 3 shows a side view of the fastening end of the tool housing engaging the wall anchor, the wall anchor being fastened.

It is now referred to FIG. 2. When fastening a wall anchor 3 in a bore in a wall plate 2, a centre screw 32 is slightly screwed out, allowing the claw of the screw gripping end 121 of the slide supportingly engage underneath a centre screw head 321 and the anchor contact face 1131*a* of the slide housing 113 simultaneously resting supportingly on a facing collar 311 of a wall anchor body 31. By pushing the first lever 13 towards the handle 114, the slide 12 is displaced to its second position as shown in FIG. 3, causing legs 312 of the wall anchor body 31 to expand, thus fastening the wall anchor 31. Thereafter, the first lever 13 is released, allowing the slide 12 to revert to its first position for releasing the tool 1 from the wall anchor 3.

Figure 4:
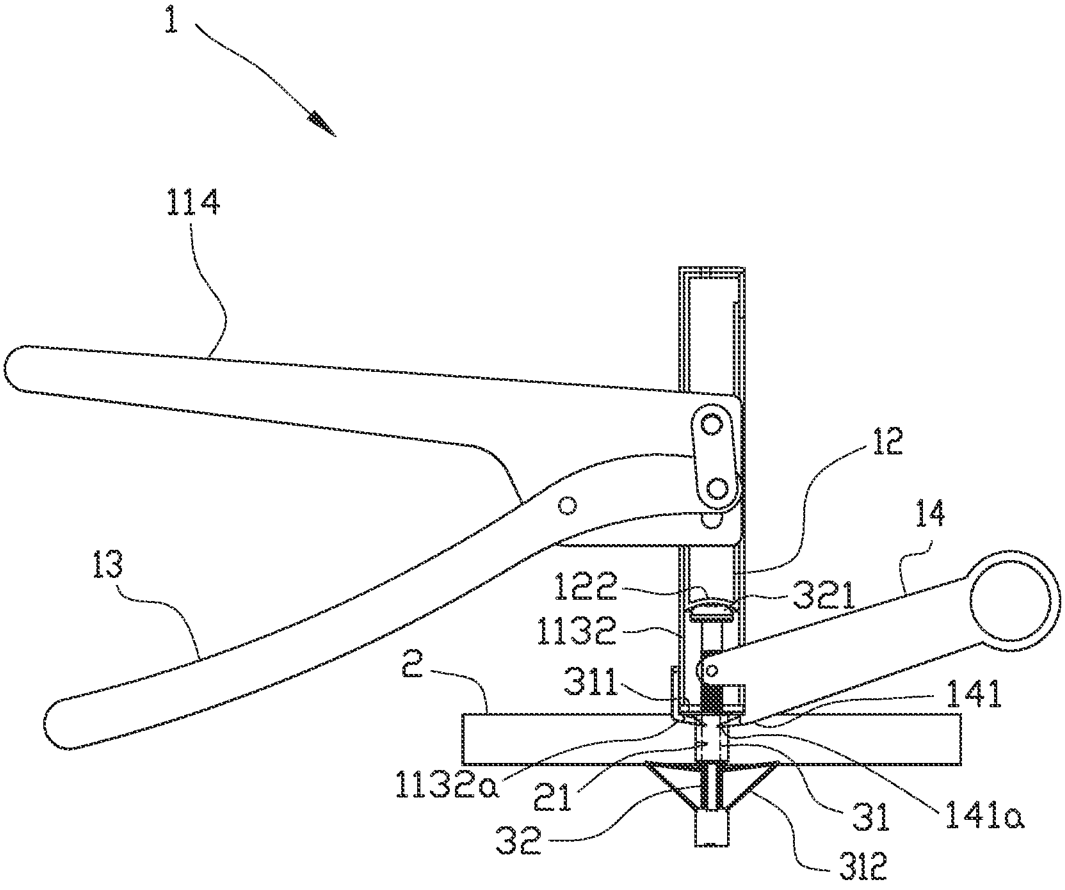
FIG. 4 shows a side view of the releasing end of the tool housing engaging underneath a collar of the wall anchor attached in the bore of the wall plate.
Figure 5:
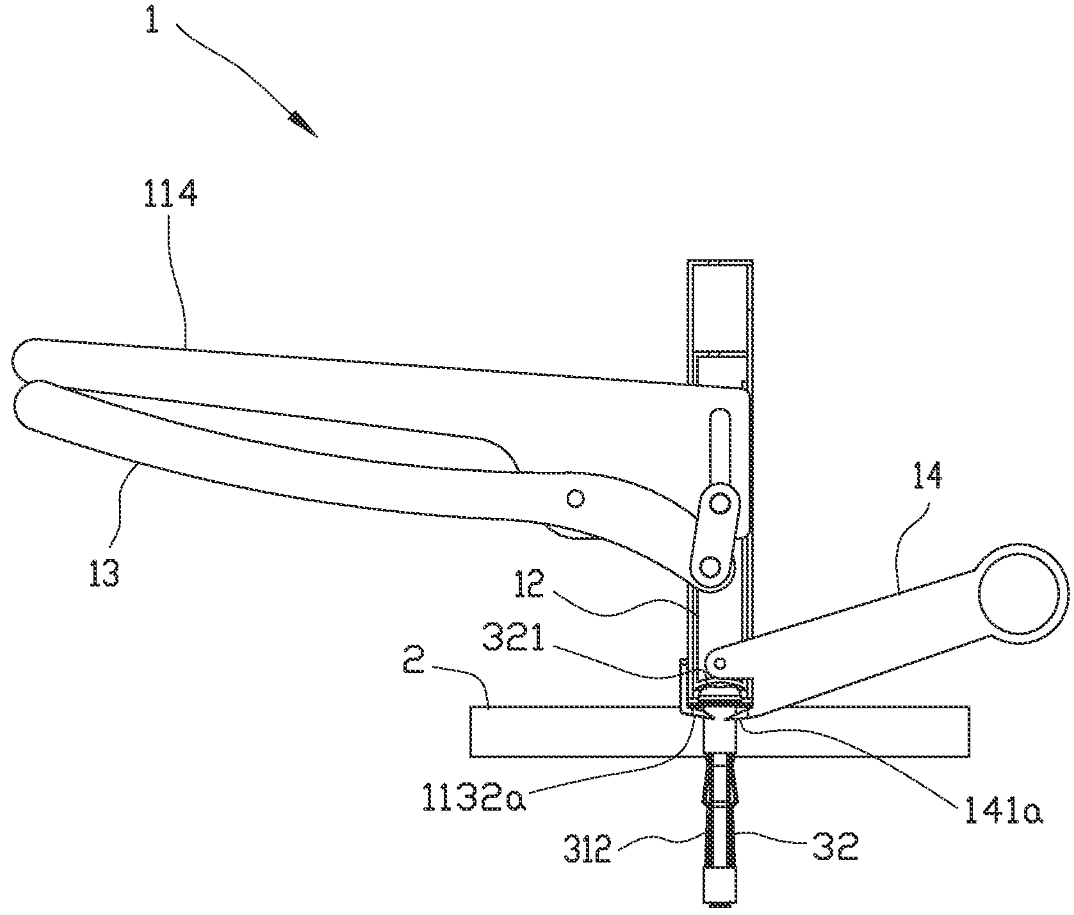
FIG. 5 shows a side view of the releasing end of the tool housing, the centre screw being pushed into the wall anchor, thereby straightening the expanded portion of the wall anchor.
Figure 6:
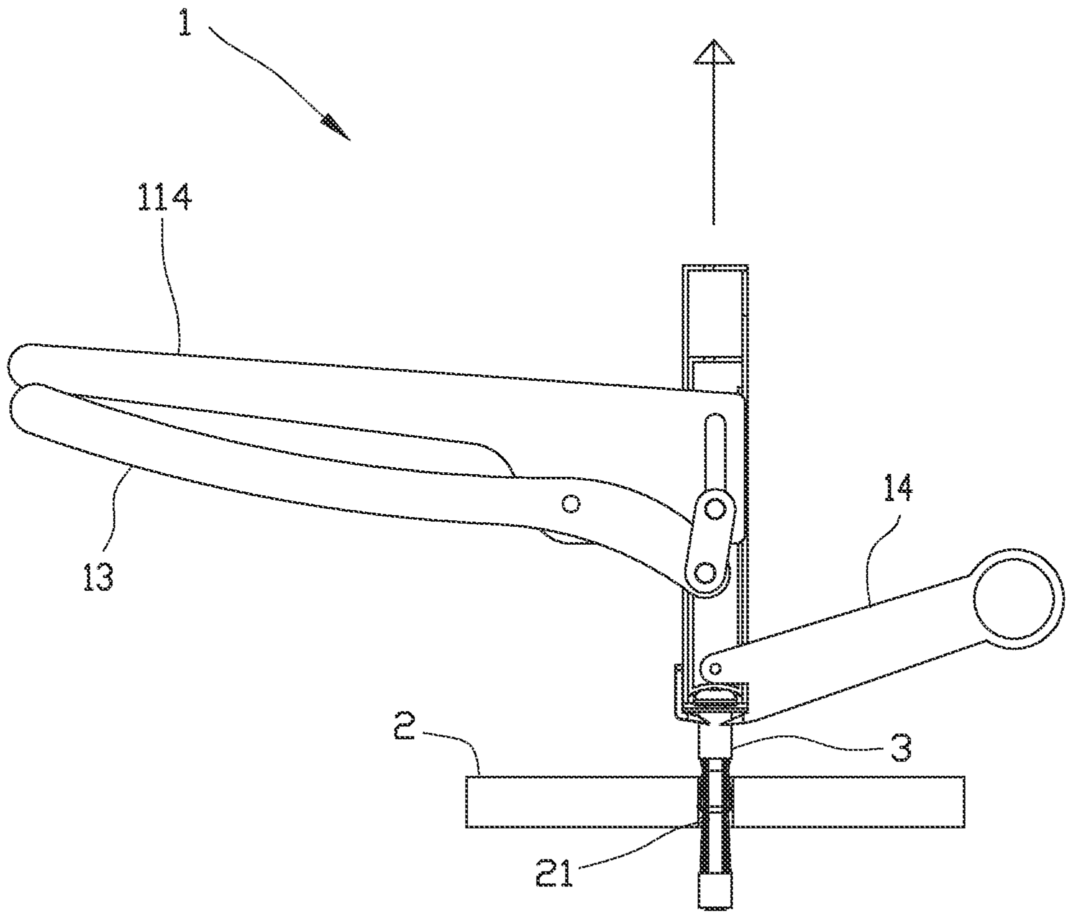
FIG. 6 shows a side view of the releasing end of the tool housing, the wall anchor being pulled out from the bore in the wall plate.

It is now referred to FIG. 4. When a wall anchor 3 is to be released from its position in a bore 21 in a wall plate 2, the centre screw 32 is screwed out, preferably to a proposed projection given by the scale 1133 of the tool 1. The projecting portion of the centre screw 32 is guided into the second housing end 1132. The anchor collar grip 1132*a* of the slide housing is inserted underneath the collar 311 of the wall anchor body 31, and the second lever 14 is operated, causing the claw 141*a* of the lever gripping end 141 gripping underneath the collar 311. Thereafter, by pushing the first lever 13 towards the handle 114, the slide 12 is displaced to its second position as shown in FIG. 5, causing the legs 312 of the wall anchor body 31 to be straightened and to become sufficiently narrow in transverse dimension to be released from the wall plate 2. Thereafter, the wall anchor 3 is pulled out as shown in FIG. 6, being hold in a firm grip with the tool 1 and freed by the second lever 14 being released.

Figure 7:
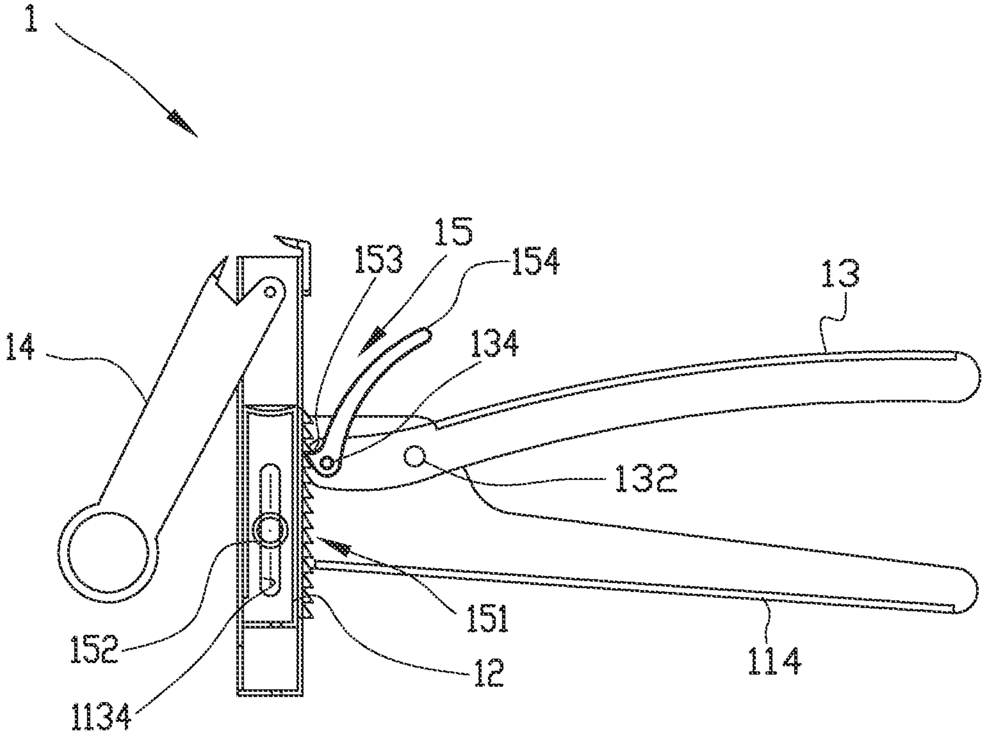
FIG. 7 shows a side view of an alternative embodiment of the wall anchor tool in an idle state.

It is now referred to FIG. 7 showing an alternative embodiment of the first lever/slide connection as shown in FIG. 1 and previously disclosed, where a rack and pawl system 15 is arranged for transforming the pushing of the first lever 13 towards the handle 114 into displacement of the slide 12. A rack 151 is integrated in the slide 12, facing a proximate end portion 134 of the first lever 13. A pawl 153 is pivotally connected to the end portion 134 of the first lever 13 and is arranged to releasably engage with the rack 151. To ease the operation of the rack and pawl system 15, a pawl releasing lever 154 is provided on the pawl 153, and a slide handle 152 is extending through the slot 1134 of the slide housing 113.

By repeatedly pushing the first lever 13 towards the handle 114, the slide 12 is displaced step by step. By releasing the pawl 153 from engagement with the rack 151, the slide 12 is returned to its first position, either by operating the slide handle 152 or by suspension means (not shown) connected to the slide.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A wall anchor fastening and releasing tool comprising:
- a tool body forming a slide housing,
- a handle rigidly projecting from the slide housing,
- a slide arranged inside the slide housing, and
- a first lever pivotally connected to the handle and arranged to displace the slide in the slide housing between a first position and a second position, wherein,
- when the first lever is in the first position, a screw gripping end of the slide is adjacent a first housing end,
- wherein, when the first lever is in the second position, the screw gripping end of the slide is retracted in the slide housing and a screw pushing end of the slide is adjacent a second housing end,
- the screw gripping end of the slide being arranged to grip underneath a head of a wall anchor center screw, and
- the second housing end being arranged to grip underneath a wall anchor collar.

2. The wall anchor fastening and releasing tool according to claim 1, wherein a second lever is pivotally connected to the slide housing with a lever gripping end arranged adjacent the second housing end to selectively grip underneath the wall anchor collar.

3. The wall anchor fastening and releasing tool according to claim 2, wherein the second lever is connected to means arranged to revert the second lever to a defined idle position when inoperative.

4. The wall anchor fastening and releasing tool according to claim 3, wherein said means are one or more springs arranged at the second lever.

5. The wall anchor fastening and releasing tool according to claim 1, wherein the second housing end is provided with an anchor collar grip in the form of a claw facing a center line of the slide housing.

6. The wall anchor fastening and releasing tool according to claim 1, wherein a second lever is pivotally connected to the slide housing with a lever gripping end arranged adjacent the second housing end, the lever gripping end being provided with a claw facing a claw provided in the second housing end, said claws forming a jaw arranged to grip underneath the wall anchor collar.

7. The wall anchor fastening and releasing tool according to claim 6, wherein the claws are provided with slanted forward portions forming opposing forward sharp edges.

8. The wall anchor fastening and releasing tool according to claim 6, wherein the second lever is connected to means arranged to revert the second lever to a defined idle position when inoperative.

9. The wall anchor fastening and releasing tool according to claim 4, wherein the second lever is connected to means arranged to revert the second lever to a defined idle position when inoperative.

10. The wall anchor fastening and releasing tool according to claim 1, wherein the screw gripping end of the slide is provided with a claw arranged to support underneath the head of the wall anchor center screw.

11. The wall anchor fastening and releasing tool according to claim 1, wherein the slide is connected to means arranged to revert the slide to a defined idle position when inoperative.

12. The wall anchor fastening and releasing tool according to claim 11, wherein said means are one or more springs arranged at the first lever.

13. The wall anchor fastening and releasing tool according to claim 1, wherein the screw pushing end of the slide is countersunk.

14. The wall anchor fastening and releasing tool according to claim 1, wherein a center screw projecting length scale is provided on a projecting end portion of the tool body.

* * * * *